ECHO SUPPRESSOR WITH IMPROVED BREAK-IN CIRCUITRY

Filed Nov. 13, 1963 2 Sheets-Sheet 1

INVENTORS P. T. BRADY
G. K. HELDER

BY [signature]

ATTORNEY

Feb. 21, 1967 P. T. BRADY ETAL 3,305,646

ECHO SUPPRESSOR WITH IMPROVED BREAK-IN CIRCUITRY

Filed Nov. 13, 1963 2 Sheets-Sheet 2

3,305,646
ECHO SUPPRESSOR WITH IMPROVED BREAK-IN CIRCUITRY

Paul T. Brady, Maplewood, and George K. Helder, Westfield, N.J., assignors to Bell Telephone Laboratories, Incorporated, New York, N.Y., a corporation of New York Filed Nov. 13, 1963, Ser. No. 323,351
6 Claims. (Cl. 179—170.6)

Figure 1:
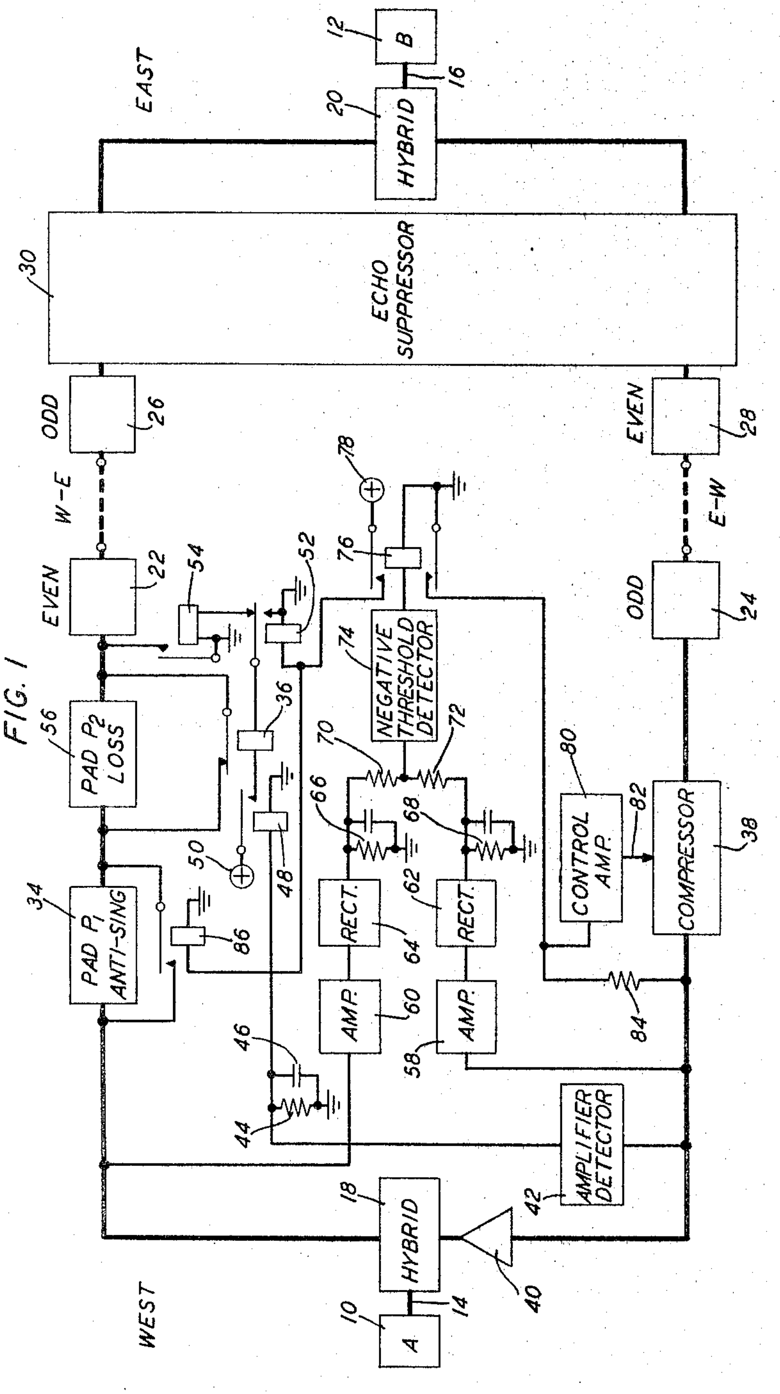

This invention relates to echo suppressors, and, more particularly, to improvements in echo suppressors for use in communication circuits having extended round-trip time delays in the speech path.

When two-wire, two-way local circuits are connected to the terminals of a typical communication facility, such as a radio relay circuit or a carrier circuit, which normally involve two one-way paths for the directions of transmission, two-wire and four-wire communication facilities are interconnected at the terminals. Although, according to common practice, hybrid or other isolation networks are normally employed at the points of interconnection between the two-wire and four-wire sections of the over-all communication circuit, the isolation so afforded is never perfect and the possibility of singing or the generation of echoes is always present. An echo is noted, for example, when the speech signal, or similar signal, applied to one terminal of the four-wire communication facility, reaches the other terminal of the facility, and, rather than being abstracted in its totality by the local circuit associated with that terminal, returns in small part to the terminal at which the signal originated, there to be detected in the local circuit associated with that terminal as an echo.

When the round-trip transmission delay in the four-wire operation of the communication circuit is small, the echo goes unnoticed in most instances. As the round-trip time delay increases, however, and becomes as great as 50 milliseconds, the echo becomes annoying and may, indeed, completely disrupt the conversation between two telephone subscribers whose local circuits are interconnected by the communication facility. In the past, various devices, which may be generally classified as echo suppressors, have been provided at the terminals of the four-wire communication facilities to alleviate the echo condition. All of these devices involve at least short circuiting, or effectively opening the path from a terminal when speech incoming from the other terminal is detected. This interrupts the transmission loop between the terminals and effectively blocks the circulation of an echo in the system. It has long since been discovered that such simple echo suppressor arrangements are of little practicable use because, normally, conversation is completely disrupted by their use. This occurs by virtue of the fact that once a speaker seizes control by being the first to speak over a circuit, the other speaker can do nothing but listen, since he has no way of replying to the conversation of the first speaker. This problem has been alleviated by the use of so-called break-in circuitry, which detects the simultaneous presence of the speech from both speakers at the point of detection, and causes further circuitry to remove the effective interruption of the path extending from the terminal of the second to speak and permits both to speak. Of course, under these circumstances, and depending largely upon the excellence of the isolation networks (usually expressed in terms of return loss) and also upon the round-trip delay, the condition of double talking so permitted may also fail to permit a useful two-way conversation by permitting echo to return to the terminal from which it originated.

Various methods have been applied, usually involving inserting losses in the form of pads in the communication circuitry, to reduce the level of the speech signals traveling in the two directions, with the result that both the speech signals and the echoes are reduced materially during double talking. Too often such circuits are useful, if at all, during the double talking condition only for alerting the subscribers to the fact that both are attempting to talk at the same time, and that one or the other should desist so that normal interchange of conversation can be resumed.

The use of fixed losses to alleviate the effects of strong echoes during double talking creates additional problems when echo suppression equipment of this type is furnished in communication links which are connected in tandem to extend a communication circuit between distant terminals. This occurs because the losses inserted for this purpose are cumulative, and the speech signals attenuated, as required to reduce the echo to a tolerable level, are soon lost in the threshold noise of the communication circuitry.

It is accordingly an object of the present invention to improve the performance of echo suppressors, particularly during the double talking phase of operation, to facilitate the continuation of conversation during double talking without the disruption ordinarily attendant upon the presence of strong echoes in the system.

It is a further object of the invention to improve the performance of multilink communication circuits when two or more links, equipped with echo suppressors, are connected in tandem.

In accordance with the above objects, a split terminal echo suppressor, according to the invention, includes at each terminal means for detecting incoming speech and blocking the outgoing path from that terminal. A differential circuit detects double talking and acts both to remove the block from the outgoing path and at the same time to insert a compressor amplifier, or the equivalent thereof, in the incoming path.

Figure 2:
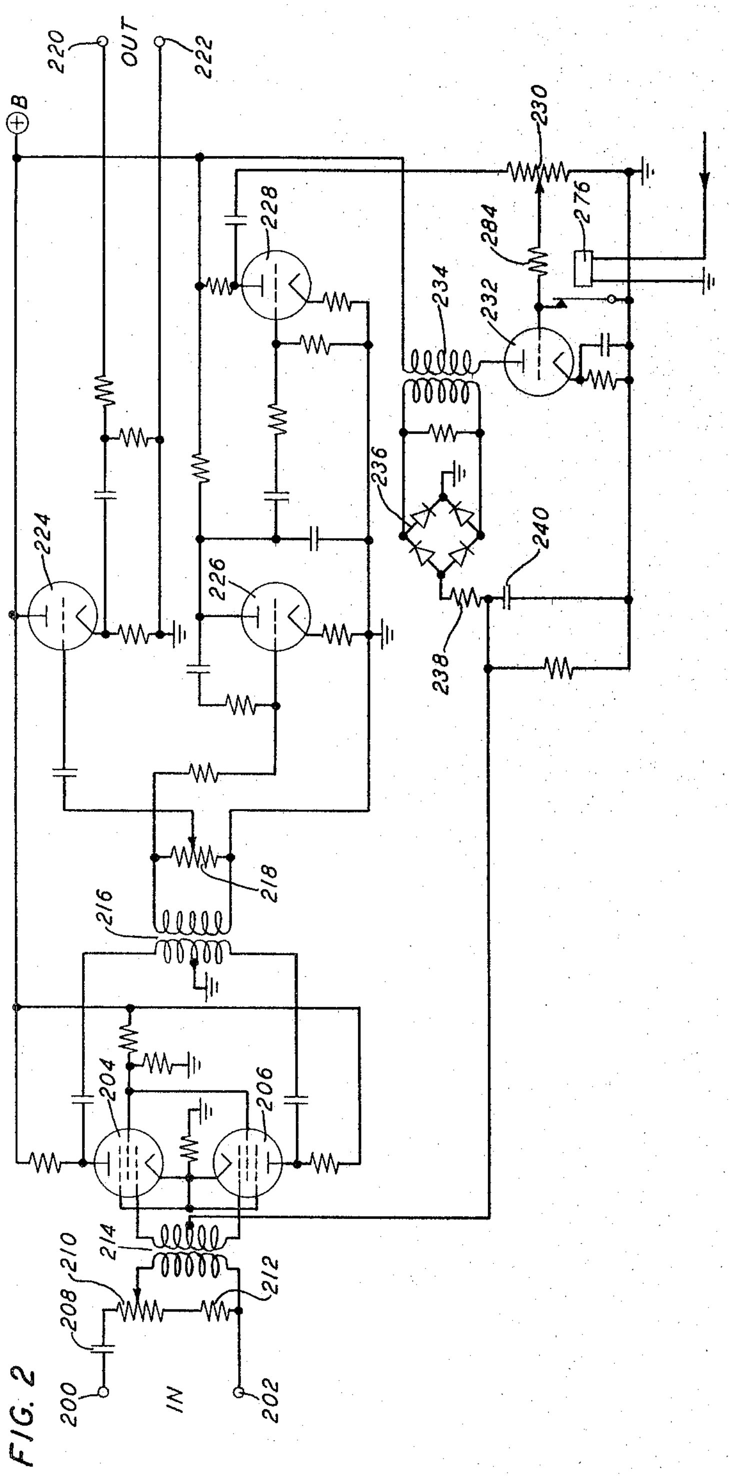

The above and other features of the invention will be described in detail in the following specification, taken in combination with the drawings, in which:

FIG. 1 is a block diagram of a communication circuit involving both two and four-wire sections and equipped with split terminal echo suppressors in accordance with the invention, and FIG. 2 is a schematic circuit diagram illustrating details of the control amplifier and compressor circuitry of the circuit diagram of FIG. 1.

As shown in FIG. 1 of the drawing, a communication system involving the echo suppression problems and embodying an echo suppressor in accordance with the invention, comprises first and second local circuits 10 and 12 (identified also by the letters A and B, respectively, designating the two using speakers or subscribers), which are connected to the terminals of a communication facility by two-wire, two-way circuits 14 and 16, respectively, and hybrid networks or their equivalents 18 and 20. The communication facility here involved may comprise a pair of one-way radio paths, a pair of carrier channels, or other one-way communication channels extending between the terminals. For convenience, the terminals may be considered as the East and West terminals of a communication facility, the East terminal appearing at the right-hand portion of the drawing as associated with local circuit 12, and the West terminal appearing at the left-hand portion of the drawing as associated with local circuit 10. Extending from the hybrid 18 at the West terminal of the communication facility, for example, are transmission paths, ultimately associated with a transmitter 22 and a receiver 24. At the East terminal, the transmission paths are respectively associated with a receiver 26 and a transmitter 28, so that the two terminals are joined by a pair of one-way paths; one identified as the West-East, or W-E, path in the upper portion of the drawing, extending between transmitter 22 and receiver 26; and the other, the East-West path, in the lower portion of the drawing, extending between transmitter 28 and receiver 24. For convenience in the description, the lower branch of the East-West path, as it appears at the output of receiver 24 may at times be referred to as the odd side of the communication facility, and the portion of the West-East path, as it appears at the input of transmitter 22, may be referred to as the even side of the facility. (Note that the even side for A becomes the odd side for B, and vice-versa.)

Transmitter 22 and receiver 24 at the West terminal are associated with the transmission path extending from hybrid 18 by way of the equipment shown in block diagram form which comprises one-half of an echo suppressor, the other half of which is located, as indicated at the East terminal, by the large circuit block 30 in FIG. 1 of the drawings. This configuration is commonly referred to as a split terminal echo suppressor and, in accordance with usual practice, the equipment at the two terminals is identical, those portions associated with the transmitter in the West-East path being the same as those associated with the transmitter in the East-West path, and those associated with the receiver in the West-East path similarly being duplicated by those at the receiver in the East-West path. Hereinafter, consideration of the circuitry of the invention will be confined to the equipment provided at the West terminal and this equipment is shown in FIG. 1 of the drawings in the condition in which it is found when the circuitry is at rest, that is, when neither subscriber A or B is talking.

Under this condition, local circuit 10, associated with hybrid 18, is connected by way of a pad 34, the operation of which will be considered in detail hereinafter, and the normally closed contacts of a relay 36 to the input of transmitter 22. Similarly, incoming signals from the East-West channel reach the local circuitry by way of hybrid 20, over a path including receiver 24, a compressor amplifier 38, which is operated in its quiescent condition in which no compression of signals is produced, and an isolation amplifier 40. In the rest condition, just considered, only three elements act upon the signal path. The isolation amplifier 40 serves to prevent the speech emanating from local circuit 10 from appearing in the East-West transmission path, and pad 34 introduces a fixed loss, 6 db, for example, in the four-wire transmission loop, comprising the West-East and East-West channels, and the transhybrid leakage paths of hybrids 18 and 20. Similar elements are, of course, effective in the signal path at the other terminal of the system under the same conditions, so that two pads, one of which is antising pad 34, are in circuit to attenuate, and thereby suppress singing in the loop circuit.

In common with the prior art in echo suppressors, the echo suppressor of the invention includes facilities for interrupting or blocking the transmission path from one terminal whenever signals are received from the other or far end terminal. These facilities include an amplifier detector 42, which abstracts a sample of the odd-side signal received in the East-West channel and provides a direct-current output indicative of the receipt of a signal. This output is applied to a holding circuit, including resistor 44 and capacitor 46, and thence to the winding of relay 48. When relay 48 is energized, its normally open contact closes, completing a path between a source of operating potential 50 and ground, by way of the winding of the relay 36, referred to before, and the normally closed contact of relay 52, through the winding of suppression relay 54. Relay 54, in operating, completes a circuit through its normally open contact which grounds the even side of the West terminal by short circuiting the input to transmitter 22. At the same time, operation of relay 36 opens its normally closed contact, thus removing the transmission circuit shunting a fixed attenuator or pad 56, which is thus inserted in the transmission circuit, but at this particular time, performs no significant function.

It will be seen that upon detection of an incoming signal from the East terminal, the transmission path from the West terminal is effectively interrupted or blocked. Under these conditions, B's speech is perceived by subscriber A in his local circuit 10, and, because the return path is blocked, no echoes can return to the East terminal by way of the anshybrid leakage path of hybrid 18. Because of the fact that identical facilities are provided at the East terminal, subscriber A will be spared the annoyance of echo if he speaks while B remains silent, since the return path from the East terminal will, likewise, be blocked.

Double talking is permitted and may be accomplished by the break-in circuitry, shown in FIG. 1 and now to be described. This circuitry functions, in brief, to determine whether both the far-end and the near-end subscriber are speaking, to distinguish between the echo of the far-end speaker and the attempted speech of the near-end speaker and to establish those conditions under which the block or short circuit should be removed from the return path to permit simultaneous conversation in both directions. This circuit also controls other adjustments in the transmission facilities to facilitate conversation during double talking in accordance with the invention. The break-in circuitry includes identical elements associated with the odd and even paths of the echo suppressors, and exemplified at the West terminal by amplifiers 58 and 60 and rectifiers 62 and 64, respectively. In each instance, the amplifier abstracts a sample of the signal in the path with which it is associated, for application to a rectifier which rectifies the signals to provide a direct-current output. Rectifiers 62 and 64 are so poled that the output of rectifier 62 is positive and that of rectifier 64 is negative both with respect to ground. These outputs are smoothed by smoothing circuits 66 and 68, respectively, and are combined in the network comprising resistors 70 and 72.

The lower branch of the break-in circuitry, including amplifier 58 and rectifier 62 and smoothing network 68, is designated as a reference channel and serves to provide a controlled quantity across resistor 72 which is representative of speech signals received from the East terminal of the system. The corresponding circuitry in the upper branch of the break-in circuit and comprising amplifier 60, rectifier 64 and smoothing circuit 66, provides a signal which may signify the existence of either of two conditions. First, it may represent the echo signal which has traversed the leakage path of hybrid 18 and is ready, unless interrupted, for retransmission as echo to the speaker at the East terminal of the system, or, second, it may represent speech signals originating with subscriber A for transmission to the East terminal of the system. If the first of these two conditions exists, double talking has not occurred and it is necessary for the break-in detector to recognize this condition and to maintain in the circuit the suppression inserted when the far-end speaker was first determined to have been talking. If the latter condition exists, the break-in detector circuitry must provide an output signal to perform those operations which will optimize the performance of the communication facility during double talking. Accordingly, smoothing circuit 68 provides a greater time constant or greater smoothing than smoothing circuit 66. Furthermore, the decay in the circuitry is appropriately adjusted so that echo traversing hybrid 18 cannot produce a component across resistor 70 which exceeds the reference signal component across resistor 72 which signal will be recognized as being proportional to the speech signal that produced echo. The greater smoothing afforded by smoothing network 68 assures that any delay in transmission through the hybrid 18 and isolation amplifier 40 will be compensated to prevent false operation of the detector upon echo signals alone. The sum of the two components appearing across resistors 70 and 72 is applied to a negative threshold detector 74 which may conveniently comprise a single diode appropriately poled to provide an output only when the input is negative with respect to ground. It will be recalled that rectifiers 62 and 64 are so poled that the output of the former is always positive while that of the latter is always negative. Thus, negative threshold detector 74 can produce no output in response to echo components alone because the negative output of rectifier 64 cannot exceed the positive output of rectifier 62 in the reference channel.

If, on the other hand, subscriber A begins to speak, his speech signals, applied through amplifier 60 to rectifier 64, produce an output which, after smoothing, generally results in a negative component of sufficient magnitude to exceed most positive components which may appear in the reference channel. Then the sum of the two components across resistors 70 and 72 in series is negative and threshold detector 74 will produce an output. This output occurs if subscriber A speaks loudly enough to overcome the reference signal in the other portion of the break-in detector, which will have some positive value if the far-end subscriber B is also speaking. The appearance of an output from threshold detector 74 thus serves to perform the same functions whether or not the far-end subscriber is speaking. It should be noted, in addition, that the output of the negative threshold detector is smoothed with a time constant so selected that slight pauses or hesitations in the speech of subscriber A will not result in the disappearance of an output signal at the output of the negative threshold detector 74.

When an output appears at this point, a break-in relay 76 is operated. This relay initiates the operation of circuits performing several functions, the most important of which include re-establishing the transmission path to the remote terminal and inserting certain losses in both the transmission and receiving sides (even and odd sides) of the communication facilities at the near terminal.

In the arrangement of FIG. 1, re-establishment of the transmission path to the East terminal is accomplished by opening the operating circuit of relay 54. This, in turn, is performed by the transfer contacts of relay 52. When break-in relay 76 operates, a source of potential at 78 is connected through a pair of operated contacts of relay 76 to operate relay 52. At the same time, operation of break-in relay 76 completes a circuit to ground through the lower relay contacts to a control amplifier 80 associated with compressor amplifier 38 by way of lead 82 and control resistor 84.

At the same time, relay 52, through its operated contact, transfers the operating circuit of relay 36, substituting a direct ground connection for the connection to ground by way of the winding of relay 54 to permit this relay to remain operated from source 50 if speech is being received from the East terminal of the system. If no speech is received from the East terminal of the system, relay 48 releases and, in turn, relay 36 returns to its unoperated condition. Thus, it will be seen that in addition to activating compressor amplifier 38 to introduce a compression loss in the incoming transmission path from the East terminal the bypass circuit normally completed around pad 56 in the outgoing path to the East terminal is opened. It will be recognized that losses are thus simultaneously inserted in both transmitting and receiving paths at the West terminal.

In addition, operation of break-in in relay 76 completes an operating circuit from potential source 78 to a relay 86 which, upon operating, serves to complete a circuit bypassing antising pad 34. As a result of these adjustments, when subscriber A alone talks, the antising pad 34 is removed from the circuit and A's speech is transmitted without attenuation to the far-end terminal. (Pad 56 is not operated if A is talking alone.) If true double talking occurs, the losses represented by pad 56 and compressor amplifier 36 are made effective, while the antising pad 34 is removed.

As indicated hereinbefore, it has been customary to insert losses in the talking paths of the terminal of a communication facility to permit double talking at reduced level. According to the invention, however, the loss inserted in the receiver, or odd side path is provided by a compressor amplifier 38 rather than by a simple attenuator or pad. Amplifier 38, the circuit arrangement of which will be considered hereinafter, serves when switched to operate in a compression mode to attenuate high amplitude signals to a greater extent than low amplitude signals. This serves during double talking to suppress high level echoes which might originate at the West terminal, if subscriber B is a so-called loud talker, without completely obliterating speech signals from the East terminal which may be of a very low level if subscriber B is a so-called weak talker. The amount of compression utilized, however, must be carefully chosen so that the speech signals of a strong, or normal, talker at the far-end terminal are not too severely attenuated to become lost to the subscriber at the terminal under consideration. It is for this purpose that attenuator pad 56 is employed. Since this pad is in the path that must be traversed by echo signals, but not in the path which is traversed by incoming speech signals, the combination of compression in the incoming path and attenuator in the outgoing path may be utilized to suppress echo without, at the same time, reducing speech signals to an undesirably great extent.

Further, the use of compressor 38 rather than a conventional attenuator in the incoming path, has an important additional advantage in that the loss required to suppress echoes need not be repeated in links when a plurality of links, each including an echo suppressor, is connected in tandem. The losses introduced by pads in prior echo suppressors have attenuated all signals equally. Thus, in order to suppress echoes in the first link of a multilink system the speech signals of the far-end talker must also be attenuated by the same amount. In succeeding links echo is eliminated by additional attenuation and the already attenuated speech signals are further reduced in level. This continues from link to link until the speech signals are lost in the circuit noise. When a compressor is used according to the invention, both echo and speech are, or may be, attenuated by the compressor in the first link of a multilink system, but in subsequent links, the speech, already attenuated in one suppressor, is relatively unaffected by the compressors in subsequent links and is thus preserved.

Although compressor amplifier 38 may be of any convenient design, one embodiment useful in the practice of the invention is that disclosed in FIG. 2 of the drawings which comprises a schematic circuit diagram of compressor amplifier 38, together with the circuit control amplifier 80, associated therewith. As shown in FIG. 2, signals from the far-end terminal are applied between terminals 200 and 202 to the input circuit of push-pull amplifier comprising remote cut-off pentode vacuum tubes 204 and 206. A signal appearing between terminals 200 and 202 is applied by way of a capacitor 208, a potentiometer 210, a resistor 212 to the primary winding of an input transformer 214, the secondary winding of which is connected to the control grids of the two tubes in the usual manner. The output signals from this amplifier which serves as the compressor amplifier of FIG. 1 of the drawings, appears across the primary winding of an output transformer 216, the secondary winding of which is connected in parallel with the winding of a potentiometer 218, the tap of which provides an output signal for application to output terminals 220 and 222 by way of a cathode follower amplifier stage 224 which serves as an isolation amplifier.

The output signal appearing across the secondary winding of transformer 216 is also applied to input of a two stage amplifier including vacuum tubes 226 and 228, connected as conventional resistor-coupled amplifiers, which form a part of the circuitry of control amplifier 80 in FIG. 1 of the drawings. The amplified output signal appearing across potentiometer 230 in the anode circuit of vacuum tube 228 is applied as a control signal to a triode tube 232. Resistor 284, corresponding to resistor 84 of FIG. 1, serves to isolate the short-circuit of relay 276 from the output of tube 228. This is necessary because the amplifier detector and amplifier (Nos. 42 and 58 of FIG. 1) are also attached to tube 228 and would not operate if relay 276 grounded its signal. The resulting output signal is applied by way of an output transformer 234 to a full wave rectifier 236, which serves to produce a corresponding direct-current signal at the junction of resistor 238 and capacitor 240 for application as a compressor control signal by way of a tap at the midpoint of the secondary winding of transformer 214 associated with the control grids of compressor amplifier tubes 204 and 206. Under the normal condition of operation, that is, when no double talking occurs, the application of this control signal is blocked at the input to control triode tube 232, which is short circuited by the normally closed contact of a relay 276 corresponding to break-in relay 76 of FIG. 1 of the drawings. Under these conditions, no control signal is fed back to remote cut-off amplifier tubes 204 and 206, and a predetermined amount of amplification is provided between input terminals 200 and 202 and output terminals 220 and 222. When break-in occurs, relay 276 operates to remove the short circuit at the input of control tube 232 and the control voltage developed across the output branch of rectifier 236 is applied to amplifier tubes 204 and 206 to introduce signal compression in the circuit between the input and output terminals of the unit.

It will be recognized that the introduction of the compressor is under the control of the subscriber at the West station, since whether or not a far-end speaker is talking, initiation of speech by subscriber A serves to operate the break-in relay and to introduce this element in the circuit. The introduction at loss pad 56 (FIG. 1) is under the control of the far-end speaker.

What is claimed is:

1. In a communication system, first and second terminals, a two-way local circuit associated with each of said terminals, first and second transmission circuits, means interconnecting said transmission and the local circuits at said terminals to permit two-way transmission between said local circuits and means for suppressing echoes in said transmission despite extended delay in said transmission circuits comprising at each terminal means for detecting speech incoming to that terminal, and means responsive to said detecting means for opening the transmission circuit to the other of said terminals, means for detecting speech originating at that terminal and first means responsive to said last-mentioned detecting means for reestablishing the path to said other terminal and second means responsive to said last-mentioned detecting means for modifying incoming speech signals to attenuate high amplitude signals to a greater extent than low amplitude signals only when speech originating at the other of said terminals is detected.

2. In a communication system, first and second terminals, a two-way local circuit associated with each of said terminals, first and second transmission circuits, means interconnecting said transmission and the local circuits at said terminals to permit two-way transmission between said local circuits and means for suppressing echoes in said transmission despite extended delay in said transmission circuits comprising at each terminal means for detecting incoming speech signals and effectively blocking the transmission circuit to the other of said terminals, means for detecting double talking, a compressor, means responsive to said double talking detector means for reestablishing the transmission path to the other of said terminals and for inserting said compressor in the incoming path to that terminal.

3. In a communication system, first and second terminals, a two-way local circuit associated with each of said terminals, first and second transmission circuits, means interconnecting said transmission and the local circuits at said terminals to permit two-way transmission between said local circuits and means for suppressing echoes in said transmission circuits despite extended delay in said transmission circuits comprising at each terminal means for detecting incoming speech signals and effectively opening the transmission circuit to the other terminal, a break-in detector sampling speech signals in both the incoming and outgoing paths from said terminal and producing an output signal whenever the outgoing speech signal exceeds the former by a predetermined extent, a compressor, means responsive to said output signals for re-establishing the outgoing path, and means also responsive to said signal for inserting said compressor in the incoming path at a point between the other terminal and the point at which incoming speech signals are sampled for said break-in detector.

4. In a communication system, first and second terminals, a two-way local circuit associated with each of said terminals, first and second transmission circuits, means interconnecting said transmission and the local circuits at said terminals to permit two-way transmission between said local circuits and means for suppressing echoes in said transmission despite extended delay in said transmission circuits comprising at each terminal means for detecting incoming speech signals and effectively blocking the transmission circuit to the other terminal, an attenuator providing a fixed transmission loss, a compressor, means for detecting double talking, means responsive to said double talking detector for re-establishing the transmission path to the other terminal, and additional means also responsive to said double talking detector for simultaneously inserting said attenuator in the outgoing transmission path and the compressor in the incoming transmission path at said terminal.

5. In a communication system, first and second terminals, a two-way local circuit associated with each of said terminals, first and second transmission circuits, means interconnecting said transmission and the local circuits at said terminals to permit two-way transmission between said local circuits and means for suppressing echoes in said transmission despite extended delay in said transmission circuits comprising at each terminal a fixed attenuator normally connected in the transmission path from said terminal to prevent singing in the circuit loop including the two transmission paths, means for detecting incoming speech signals and effectively blocking the transmission circuit to the other terminal, a compressor, means for detecting double talking and producing an output signal, first means responsive to said output signals for removing the antising attenuator from the transmission path, and additional means for inserting said compressor in the incoming path from said other terminal, and further means also responsive to said signal for re-establishing the transmission path to said other terminal.

6. In a communication system, first and second terminals, a two-way local circuit associated with each of said terminals, first and second transmission circuits, means interconnecting said transmission and the local circuits at said terminals to permit two-way transmission between said local circuits and means for suppressing echoes in said transmission despite extended delay in said transmission circuits comprising at each terminal first detecting means for producing a first control signal in response to speech signals incoming from the other terminal, means responsive to said first control signal for effectively opening the transmission path to the other terminal, second detecting means for detecting double talking and producing a second control signal, an antising attenuator normally connected in the path to said other terminal, an attenuator producing a fixed loss and a compressor circuit, first means responsive to said second control signal for re-establishing the transmission path to the other terminal, second means responsive to said second control signal for removing said antising attenuator from the transmission path to said other terminal and third means responsive to said second control signal for simultaneously inserting the compressor in the path incoming from said other terminal and said fixed loss attenuator in the path outgoing to said other terminal.

References Cited by the Examiner

UNITED STATES PATENTS

| | | | |
|---|---|---|---|
| 2,043,403 | 6/1936 | Wright et al. | 179—170.6 |
| 2,257,806 | 10/1941 | Mitchell | 179—170.6 |
| 3,128,353 | 4/1964 | Gardener | 179—170.6 |
| 3,215,789 | 11/1965 | Hunter et al. | 179—170.6 |

KATHLEEN H. CLAFFY, *Primary Examiner.*

H. ZELLER, *Assistant Examiner.*